(12) United States Patent
Kassa et al.

(10) Patent No.: US 11,240,752 B2
(45) Date of Patent: Feb. 1, 2022

(54) ADAPTIVE ENERGY EFFICIENT CELLULAR NETWORK

(71) Applicant: Morgan State University, Baltimore, MD (US)

(72) Inventors: Hailu Kassa, Nottingham, MD (US); Kevin Kornegay, Towson, MD (US)

(73) Assignee: Morgan State University, Baltimore, MD (US)

( * ) Notice: Subject to any disclaimer, the term of this patent is extended or adjusted under 35 U.S.C. 154(b) by 85 days.

(21) Appl. No.: 16/781,480

(22) Filed: Feb. 4, 2020

(65) Prior Publication Data

US 2020/0252869 A1 Aug. 6, 2020

Related U.S. Application Data

(60) Provisional application No. 62/800,719, filed on Feb. 4, 2019, provisional application No. 62/943,956, filed on Dec. 5, 2019, provisional application No. 62/944,197, filed on Dec. 5, 2019.

(51) Int. Cl.
*H04W 52/02* (2009.01)
*G06F 9/30* (2018.01)
*H04W 52/46* (2009.01)

(52) U.S. Cl.
CPC .... *H04W 52/0212* (2013.01); *G06F 9/30036* (2013.01); *H04W 52/0206* (2013.01); *H04W 52/46* (2013.01)

(58) Field of Classification Search
CPC ......... H04W 52/0212; H04W 52/0206; H04W 52/46; G06F 9/30036
See application file for complete search history.

(56) References Cited

U.S. PATENT DOCUMENTS

| | | | |
|---|---|---|---|
| 8,224,253 B2 | 7/2012 | Ofek et al. | |
| 8,913,972 B2 | 12/2014 | Luz et al. | |
| 8,934,843 B2 | 1/2015 | Eldering | |
| 8,982,797 B2 | 3/2015 | Mochida | |
| 9,640,866 B2 | 5/2017 | Kuamr | |
| 9,699,666 B2 | 7/2017 | Lerbour et al. | |

(Continued)

*Primary Examiner* — Jamal Javaid
(74) *Attorney, Agent, or Firm* — Whiteford, Taylor & Preston, LLP; Gregory M. Stone (57) ABSTRACT

Methods and systems are provided for managing a smart antenna system to maximize energy efficiency while maintaining spectral efficiency and signal integrity. In accordance with certain aspects of a particularly preferred embodiment, antenna beamforming may be optimized at a base station by combining a recursive least squares beamforming technique with Kaiser windowing functions to enable side lobe cancellation in the emitted beam, thus enhancing the capacity and service quality of smart antenna systems. With respect to further aspects of a particularly preferred embodiment, processing methods may be implemented at the base station of a cellular network to cluster mobile stations in a way that improves overall energy efficiency of a base station in the cellular network. More particularly, mobile stations or users may be clustered using a linear radius clustering method and a last user sector based clustering method to direct the beam emitted from the base station antenna to those sectors determined to contain the users having the greatest signal resource need.

10 Claims, 8 Drawing Sheets

(56) References Cited

U.S. PATENT DOCUMENTS

| | | | |
|---|---|---|---|
| 9,735,940 B1 | 8/2017 | Bakr et al. | |
| 10,062,966 B2 | 8/2018 | Mangenot et al. | |
| 10,158,445 B2 | 12/2018 | Gomez et al. | |
| 2010/0109965 A1* | 5/2010 | Foo | H01Q 21/08 343/836 |
| 2013/0080457 A1 | 3/2013 | Narayanan et al. | |
| 2013/0329588 A1 | 12/2013 | Sangwan et al. | |
| 2016/0037291 A1 | 2/2016 | Sadasivam et al. | |
| 2017/0264246 A1 | 9/2017 | Lee et al. | |

* cited by examiner

ADAPTIVE ENERGY EFFICIENT CELLULAR NETWORK

CROSS REFERENCE TO RELATED APPLICATIONS

This application is based upon and claims the benefit of U.S. Provisional Application No. 62/800,719 titled "RLS-Kaiser Based Smart Antenna System," filed with the United States Patent & Trademark Office on Feb. 4, 2019. This application is also based upon and claims the benefit of U.S. Provisional Application No. 62/943,956 titled "Linear Radius User Clustering Method," filed with the United States Patent & Trademark Office on Dec. 5, 2019. This application is still further based upon and claims the benefit of U.S. Provisional Application No. 62/944,197 titled "Adaptive Last User Sensitive Sector Based Clustering Method," filed with the United States Patent & Trademark Office on Dec. 5, 2019. The specifications of each of the foregoing are incorporated herein by reference in their entireties.

GOVERNMENT LICENSE RIGHTS

Portions of the invention described herein were made with government support under Contract No. 1458930 awarded by the National Science Foundation. The U.S. government may have certain rights in the invention.

FIELD OF THE INVENTION

This invention relates generally to wireless communication systems, and more particularly to systems and methods for optimizing energy and spectral efficiency in wireless communication networks.

BACKGROUND OF THE INVENTION

Since their introduction, wireless communication networks have grown in size and complexity, and consumers, businesses, governments, and practically anyone across the globe that relies on any type of communication have increasingly become wholly dependent upon them. The growth of services and features offered by wireless networks has greatly expanded the number of users that access them, and in turn, the energy consumed by them. As interest simultaneously grows among most global populations and governments in finding ways to reduce energy consumption, challenges have arisen in crafting energy efficient solutions in the wireless communications field that have a real energy saving impact but that retain the required integrity to be able to service an ever-increasing need for access to network resources.

Base stations of wireless communication networks are a major contributor to the vast amount of energy expended in operating such networks. Currently, more than 4 million base stations serve mobile users, and each year 120,000 new base stations are deployed, servicing 400 million new mobile subscribers around the world. Each base station consumes, on average, 25 MWh per year, such that electricity has become a significant cost factor for both network operators and their users.

Because of these incredible power demands, efforts have been undertaken to mitigate energy use through, among other methods, providing smart antenna systems at the base stations that are able to manage power more efficiently while trying to maintain service integrity. For instance, base stations can support multiple directional antennas to increase network throughput and reduce the average energy required to transmit bits through the network. Smart antenna beamforming algorithms can help increase transmitter energy efficiency by directing the antenna array's radiation maximum in the direction of the target receiver. As a result, the signal reaches the receiver with less transmitted power than what would be incurred by a more traditional sectored antenna.

However, such smart antenna systems have their challenges. In a smart antenna system, the side lobe of the transmitted beam is the primary cause of energy loss and interference. Due to its narrow beam width, interference rejection, and fast convergence, prior efforts directed towards optimizing smart antenna systems have focused on application of the Recursive Least Squares ("RLS") algorithm. For example, U.S. Pat. Nos. 8,982,797 and 8,934,843 are directed to resource allocation/weighting for antenna arrays. U.S. Pat. No. 9,640,866 employs RLS among other algorithms for multi-beam adaptive nulling. U.S. Pat. No. 9,735,940 is directed to optimizing capacity of adaptive array systems. U.S. Pat. No. 10,158,445 is directed to unwanted interference. Further, U.S. Patent Application Publication No. 2017/0264246 is directed to an envelope tracking power apparatus and method. Nonetheless, application of the RLS algorithm is significantly impacted by high computational burden and greater power wastage due to side lobes of the emitted beam.

Still other efforts have been made to apply Kaiser windowing techniques, such as U.S. Pat. No. 10,062,966 directed to an antenna pattern generated with a controlled envelope. However, such efforts have not sufficiently addressed the need to improve energy efficiency in such smart antenna systems.

Additionally, efforts have been made to minimize energy consumption per traffic load and to maximize energy efficiency under given QoS constraints, particularly given the increasing use of wireless connectivity via smartphones, laptop computers, and the Internet of Things (IoT), and their resultant surge in network traffic and related energy consumption. Such efforts have included processes to adaptively adjust cell size according to traffic load, user distance from the base station, user requirements, and channel conditions, along with "sleeping" base stations at times when traffic is low, and clustering users in different cells around the base station to maximize coverage in those cells that have higher numbers of users. For example, U.S. Patent Application Publication No. 2016/0037291 is directed to determining if the position of a mobile device in a cellular network is a place of relevance to the user. U.S. Patent Application Publication No. 2013/0080457 is directed to clustering concepts and using centroids to determine proper positions. U.S. Pat. No. 9,699,666 is directed to a method to optimize a cellular network based on data rate or spectral efficiency as performance indicators and also based on antenna characteristics. U.S. Patent Application Publication No. 2013/0329588 is directed to multiple types of clustering techniques. Still further, U.S. Pat. No. 8,224,253 is directed to antenna beam-forming capability, and U.S. Pat. No. 8,913,972 is directed to a multi-core DSP processing system for performing antenna clustering.

Despite such prior efforts, there remains a need in the art for systems and methods capable of effectively managing or improving energy efficiency in base stations of wireless communication networks without jeopardizing spectral integrity of the signal, which would degrade quality of service.

SUMMARY OF THE INVENTION

Disclosed herein are systems and methods configured to address one or more disadvantages of the prior art systems and methods for managing base stations of wireless communication networks.

In accordance with certain aspects of an embodiment, methods and systems are provided for managing a smart antenna system to maximize energy efficiency while maintaining spectral efficiency and signal integrity. In accordance with certain aspects of a particularly preferred embodiment, antenna beamforming may be optimized at a base station by combining a recursive least squares beamforming technique with Kaiser windowing functions to enable side lobe cancellation in the emitted beam, thus enhancing the capacity and service quality of smart antenna systems. With respect to further aspects of a particularly preferred embodiment, processing methods may be implemented at the base station of a cellular network to cluster mobile stations in a way that improves overall energy efficiency of a base station in the cellular network. More particularly, mobile stations or users may be clustered using a linear radius clustering method and a last user sector based clustering method to direct the beam emitted from the base station antenna to those sectors determined to contain the users having the greatest signal resource need.

BRIEF DESCRIPTION OF THE DRAWINGS

The numerous advantages of the present invention may be better understood by those skilled in the art by reference to the accompanying drawings in which.

DETAILED DESCRIPTION

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Figure 1:
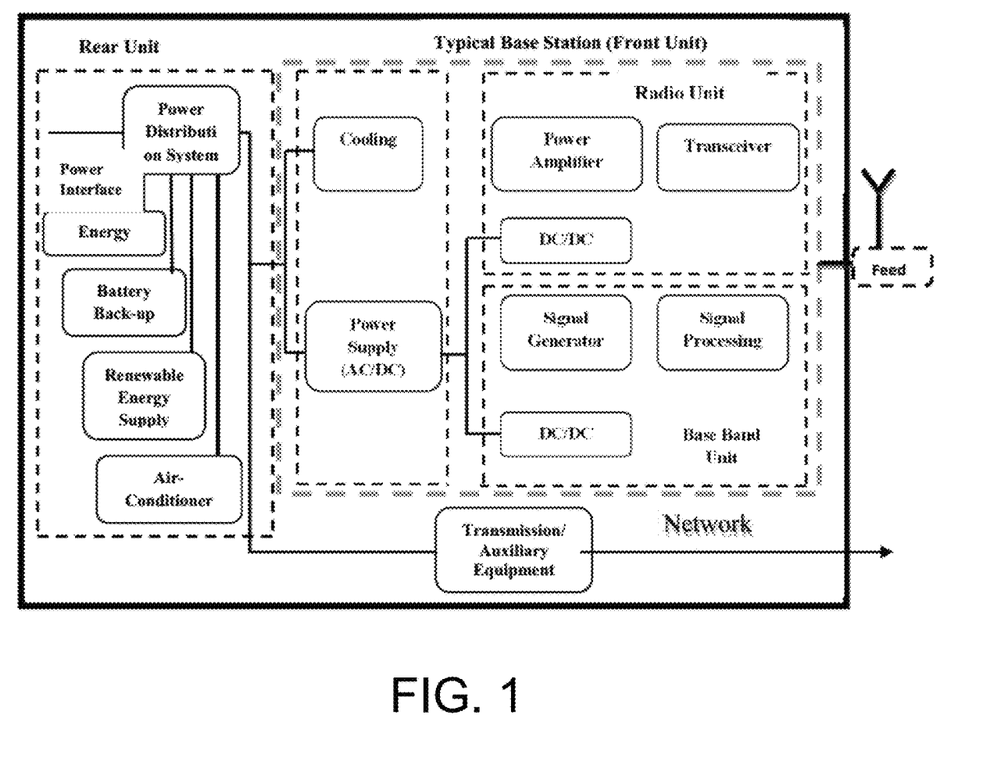
FIG. 1 is a schematic representation of a base station in a wireless communication network in which systems and methods according to certain aspects of an embodiment of the invention may be implemented.

FIG. 1 is a schematic view of an exemplary base station that may be generalized to all base station types, including macro, micro, pico, and femto base stations. In general, a base station 100 consists of multiple transceivers (TRXs) with multiple antennas. The power from the electricity grid, the battery backup unit or the renewable energy is divided into in-series and in-parallel paths. The operation of the IT equipment, which is supported by non-critical equipment is divided into radio and baseband units. The cooling infrastructure, power amplifiers, RF feeders, and the AC/DC and DC/DC conversion units are the most energy demanding devices in base stations. Other features of traditional base stations and the cellular networks in which they operate, along with additional details regarding the various algorithms discussed in greater detail below, are further explained in Hailu Belay Kassa, "Adaptive Energy Efficient Cellular Network," Doctoral Dissertation, Morgan State University, December 2018, which is incorporated herein by reference in its entirety.

Base station 100 can support multiple directional antennas to increase network throughput and reduce the average energy required to transmit bits. Smart antenna beamforming algorithms can help increase transmitter energy efficiency by directing the antenna array's radiation maximum in the direction of the target receiver. As a result, the signal reaches the receiver. This effective increase in the signal strength means that the message can be received with less transmitted power compared to using a more traditional sectored antenna. However, in such smart antenna systems, the side lobe of the generated beam is the primary cause of energy loss and interference.

Such base station smart antenna systems can benefit from application of a recursive least squares (RLS) beamforming algorithm, due to its narrow beam width, interference rejection, and fast convergence. However, the RLS algorithm is largely impacted by its high computational burden and greater power wastage due to side lobes in the generated beam.

With an adaptive antenna array, nodes in the array can focus transmission energy in the desired direction to save energy. In such a configuration, the antenna weights for the transmitter and receivers can be selected such that the transmit power can be minimized. In accordance with certain aspects of an embodiment of the invention, here a collaborative beamforming method is applied, which increases transmission range and enhances energy efficiency in the wireless system. The collaborative beamforming method in accordance with certain aspects of an embodiment of the invention combines a side-lobe cancellation method using Kaiser windowing with RLS-based beamforming processes to enhance the capacity and service quality of smart antenna systems. The energy efficiency of the algorithms applied herein enhance the network lifetime of the battery-driven device and reduces the negative impact of the unnecessary loss of energy to the environment, which contributes to the economic efficiency of the system. Applying both the Kaiser side lobe cancellation method and the RLS beamforming method discussed herein achieves an energy efficient beam formation in the presence of power constraints with the assumption of perfect channel knowledge.

The Recursive Least Square (RLS) beam-forming process set forth herein may calculate the array weight repeatedly to get an optimum weight. This process has fast convergence speed, and thus is suggested for a base station antenna system.

Figure 2:
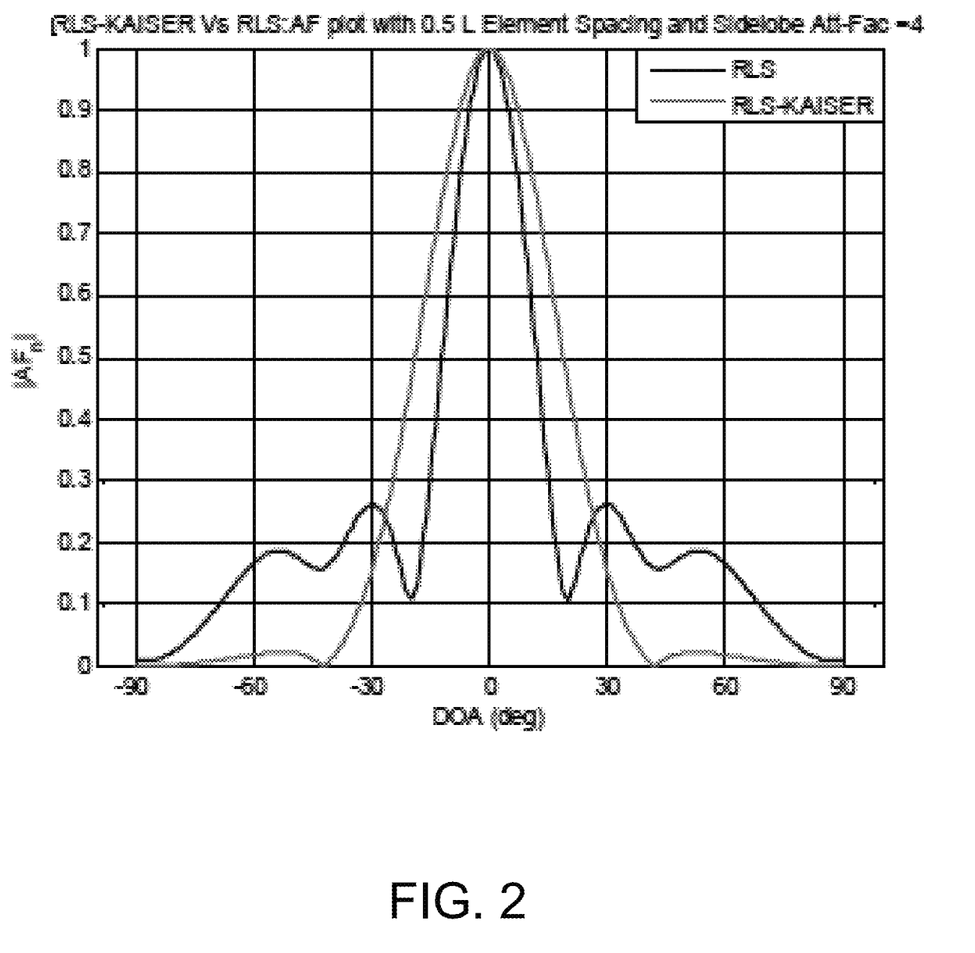
FIG. 2 is a graph comparing application of combined RLS-Kaiser processing methods to RLS processing methods alone for antenna beam forming, comparing array factor to direction of arrival ("DOA").
Figure 3:
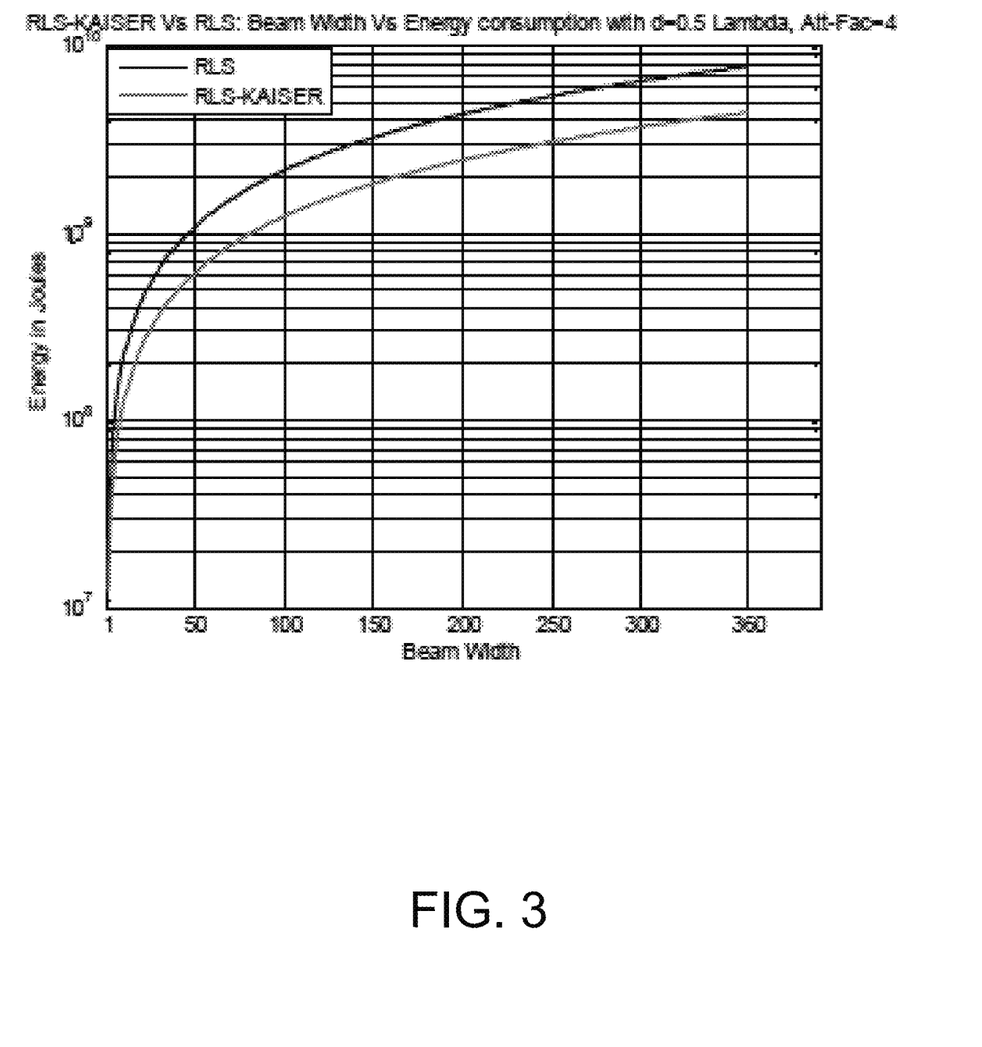
FIG. 3 is a graph comparing application of combined RLS-Kaiser processing methods to RLS processing methods alone for antenna beam forming, comparing range versus energy consumption.

Through the Kaiser windowing function, Kaiser side lobe cancellation techniques may be applied to the RLS beam forming processes as discussed below, such that an energy efficient beam formation can be achieved under secrecy constraints in the presence of both total and individual power constraints with the assumptions of perfect channel knowledge. The secrecy capacity can be maximized by increasing the transmit power while keeping the optimum transmission rate. As particularly shown in FIG. 2, for a small increase in Kaiser side lobe attenuation factor, there is a small change in bandwidth at a significant side lobe energy savings. The RLS-Kaiser combination attenuates the side lobe level to reduce energy at the expense of beam width. Therefore, the beam generated by RLS-Kaiser combination has a wider beam width than RLS alone. Further and with reference to FIG. 3, the resulting beam generated by the combined RLS-Kaiser method has better energy efficiency per range than that of RLS. Use of the RLS-Kaiser combination allows saving of large amounts of energy per beam range.

Combined RLS-Kaiser beam-forming methods as disclosed herein consume less energy per beam formation than the RLS beam forming method alone, and likewise save energy over the RLS beam-forming method alone. This indicates that for future base station systems, the combined RLS-Kaiser beam-forming methods as disclosed herein may be the best alternative for controlling and saving energy that would be wasted as a side lobe, and providing secured signal transmission at the physical layer.

Array antenna elements at the base station can be arranged in different geometries. For this method, linear array geometry is used because of its simple nature and ease of implementation. The array propagation factor for linear array geometry can be expressed as:

$$\bar{v}=[1\ e^{j\beta d\cos\theta}\ \ldots\ e^{j(N-1)\beta d\cos\theta}]$$

And the weight vector can be expressed as:

$$W^T=[w_1\ w_2\ w_3\ \ldots\ w_N]^T$$

Then the array factor for a linear array geometry becomes:

$$AF = \sum_{n=0}^{n-1} A_n e^{jn(\beta d\cos\theta+\alpha)}$$

where $\beta$ is phase constant, $\theta$ is angle of incidence, N is total number of antenna elements, d is inter element space, and $W^T$ is transpose of the weight vector.

The typical steps for RLS are as follows:

Step 1: Update the correlation matrix, $R_{xx}(k)=\alpha R_{xx}(k-1)+x(k)x^H(k)$ Step 2: Update the correlation vector, $\bar{r}_k(k)=\alpha \bar{r}_k(k-1)+d^*(k)x(k)$ Step 3: Invert the correlation matrix, $R^{-1}_{xx}(k)=[\alpha R_{xx}(k-1)+(k)x^H(k)]^{-1}$ Step 4: Find out the gain vector and $\bar{g}(k)=R^{-1}_{xx}(k)x(k)$ Step 5: Compute the weight value: $(k)=W(k-1)+\bar{g}(k)[d^*(k)-X^H(k)W(k-1)]$ The Kaiser Windowing function is expressed by using two parameters as follows: W=Kaiser (N, $\alpha$), where N is the window size and $\alpha$ is the Kaiser Window parameter that affects the side lobe attenuation and given by:

$\alpha=0.112(\beta-8.7)$, for $\beta>50$
$\alpha=0.5842(\beta-21)^{0.4}+0.07996(\beta-21)$, for $50\geq\beta\geq21$
$\alpha=0$, for $\beta<21$ The $\alpha$—Factor is a factor that affects the side lobe attenuation level of Kaiser Window, $\beta$—is the total amount of side lobe attenuated in dB.

The process for the combined RLS-Kaiser antenna beam forming method according to certain aspects of an embodiment of the invention may be stated as follows:

1: Start
2: Drive array propagation vector: $\bar{v}=e^{jn(\beta d\cos\theta)}$
3: Initialize the weight value $W=[0\ 0\ 0\ \ldots\ 0]^T$
4: Determine array factor (AF) initialize to 0: $AF_{initial}=W\cdot\bar{v}=0$
5: Determine the weight value in each K iterations:

$$(k)=W(k-1)+\bar{g}(k)[d^*(k)-X^H(k)W(k-1)]$$

6: Update the AF with each weight value: $AF=AF_{initial}+(k)\cdot\bar{v}$
7: Generate beam energy
   a) If the generated beam has side lobe, then run the Kaiser side lobe canceller W=Kaiser (N, $\alpha$)
   b) Else, assign the beam to the user The energy model used for the RLS-Kaiser beamforming algorithm is described as follows:

$$(BS,\ ms)=(\theta/360(d(BS,\ ms)*SNIR)^\alpha)+C1)+C2$$

where e is assigned energy, $\theta$ is beam width, d is the coverage distance (range), $\alpha$ is attenuation factor, C1 is overhead due to the MAC control message, and C2 is overhead due to the energy needed to tune the direction of the beam, BS is a base-station, and ms is mobile-station.

The beamwidth is the angular distance between the half power points of the main lobe. The half power points from the normalized array factor (AF) are written as $HP_{AF}=0.707$ ($AF_n$).

Using such combined RSL-Kaiser antenna beam-forming method, a considerable amount of energy may be saved over application of RSL antenna beam-forming processes alone.

Such methods may be further enhanced through clustering of mobile users that are within range of and accessing the resources of a given base station. Such additional clustering methods check base stations' traffic loading and those with lesser loads concerning a target threshold number of users and the minimum user distance that are switched into sleep mode. The clustering methods described below cluster users around them according to the particular requirements of the recited methods.

Figure 4:
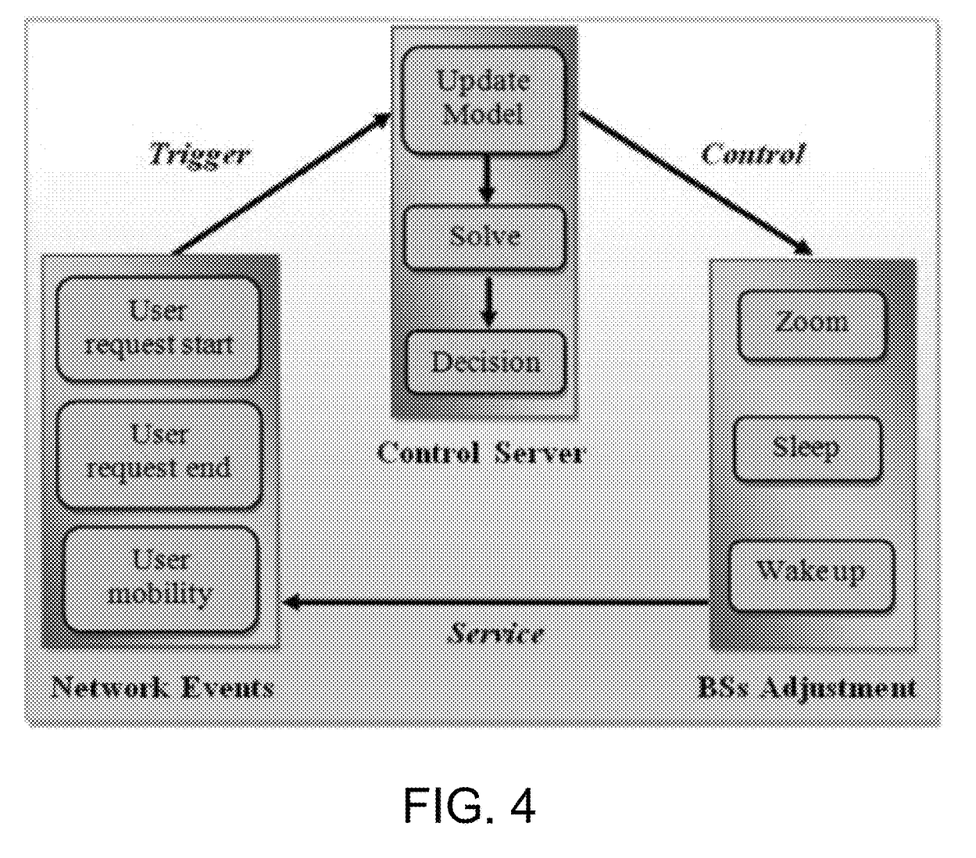
FIG. 4 is a logical flowchart reflecting a framework for implementing an energy-efficient cellular network in accordance with certain aspects of an embodiment of the invention.

As shown in the logical flowchart of FIG. 4 representing a framework of an energy-efficient cellular network in accordance with certain aspects of an embodiment of the invention, there are two basic requirements for such a system: (i) a method for gathering the traffic information in the network and cell zooming process; and (ii) infrastructure to process the traffic information and to implement cell zooming. A cell zooming server, which controls the cell zooming process, may comprise an independent entity or a virtual object in the network, which can be either implemented in the gateway or distributed in the base station. Such methods and infrastructure may assist in reducing base station energy consumption, which has great importance in wireless communication systems, and is directly related to the transmit power. As noted above, approximately 80% of the total energy consumed in the cellular network components (including, for example, the base stations, mobile stations, and core network) is consumed at the base station itself, making such methods of management power through traffic analysis an important component in an overall energy efficiency scheme.

Figure 5:
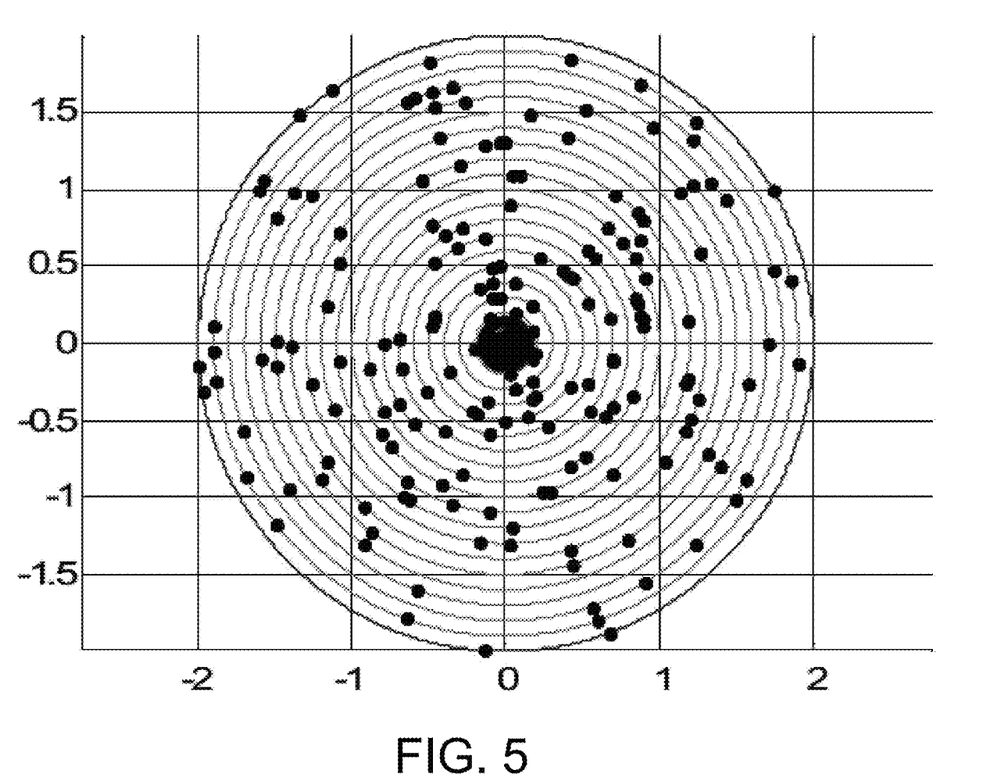
FIG. 5 is a graph of a full-coverage clustered cell in which certain energy management methods may be applied in accordance with certain aspects of an embodiment of the invention.

One such cell zooming method may be implemented using a linear radius user clustering process. Such process clusters users per a circular cell, as shown in the graph of FIG. 5 reflecting a full-coverage clustered cell. The base station coverage is divided by concentric circles with linearly increasing radii, and with users distributed randomly in the respective tracks. Thus, the circular cell is made to have different circular tracks where users are clustered. The linear radius user-clustering process in accordance with certain aspects of an embodiment of the invention is configured to count the number of mobile users at a specific time in the outer most track, and if they are less than the average density of the users in the cell, it will reduce the cell radius to the next track and marginalize the outer track users.

An adaptive sleeping process is derived to automatically sleep the base station during off-peak hours or even all the time when the number of mobile stations is under a threshold value and making zero transmit power for the case where the users are at a distance less than or equal to 100 m in order to protect the human users from hazards from high levels of electromagnetic radiation. The adaptive cell sleeping process combined with the linear radius user clustering process applied as described herein is made to instruct the base station's hardware to consume the minimum circuit power for the case where all users are within the range of 100 meters from the base station.

The linear radius user clustering process in a given cell may be carried out as follows:

First, as inputs, the cell zooming server may receive values for minimum radius, number of concentric circles, maximum radius, and $r_n$, where n=1, 2, 3, ..., and the radius of the $n^{th}$ concentric circle, which values may readily be established based on historic knowledge of network traffic by those of ordinary skill in the art. With those values as input, the following process is carried out:
 1: Initialize minimum radius
 2: $r_n = \sqrt{10^{-2k}\pi(2n-1)+r_{n-1}^2}$, where k=0 or 1.
 3: Compute area at this radius
 4: draw a circle for $r_n$
 5: Compare $r_n$ and maximum radius, $r_m$
 6: if $r_n < r_m$ then
 7: $r_n = r_n + 1$
 8: Else
 9: Stop
 10: end if $10^{-2k}$ is added on the basic derivation to obtain the minimum radius 1 km or 0.1 km based on k value.

In determining the transmit power, integration of power computation and sleeping mode are achieved. The Okumura Hata propagation model may be used as the basis for the power model itself:

$$P_t = P_r * L$$

where L and Pr are the path loss and minimum received power, respectively. The path loss at a specific time in the nth concentric circle is $$L_n = 247.41 + 35.22 * \log(R_n)$$

where $R_n$ is the radius of the $n^{th}$ concentric circle in a kilometer.

The integration of power computation and sleeping mode is then achieved as follows:
 Inputs: Number of users, the radius of the concentric circle, average density, minimum radius $R_{min}$, and $T_n$ track between two consecutive circles, n=1, 2, 3 ...
 Output: Transit Power
 1: Initialize with outer most concentric circle radius (last tracks)
 2: Count number of users between $T_n$ and $T_n-1$
 3: Calculate the area of the track (using change in radii)
 4: Compute density and compare with average density
 5: If computed density is less than average density
 6: go to step 9
 7: else adjust the transmit power based on this radius
 8: return to step 1
 9: The radius ($R_n$) reduces to $R_n-1$, where n is the index of the concentric circle
 10: if $R_n = R_{min}$, then
 11: Sleep
 12: else
 13: n=n+1
 14: go to step 2

The transmit power at each concentric circle logarithmically increases with radius. The minimum transmit power that can be allocated is at a distance of 0.2 km. This indicates that the foregoing method works to sleep the base station if the user distance is less than 0.2 km in order not to transmit the radio frequency power at this range. As a result, it contributes to the safety of humans within a specified range of the base station by minimizing exposure to high levels of electromagnetic radiation.

Another cell zooming method may be implemented using an adaptive last user sensitive sector based clustering process, in which deployed antennas are used to determine the nature of cellular communications traffic, and categorize those signals according to sector and concentric circle as defined in a particular cell coverage area. Based on the number of active signals and sectors, the network can be managed to further conserve power. Such adaptive last user sensitive sector based clustering process is based on a system that consists of one serving base station with multiple users forming a multipoint system at the base station. The base station uses both omnidirectional antenna and smart antenna systems. Circular cells are used as a simple model of radio coverage. A hexagonal cell has been universally adopted since the hexagon permits easy and manageable analysis of a cellular system. The actual radio coverage of a system is amorphous, where a regular cell shape is required for systematic system design and adaptation for future growth. A number of concentric cells drawn based on linear radius, equal area, and user density divides the cell. The users in the cell are randomly distributed, and their position changes with time. The power model of the system estimates and calculates the total power supply consumption, with the focus of this process being on downlink communications. Base station transmitters are situated at the center of the cell.

The following user-clustering processes may be applied according to circuit power consumption, dynamicity, and complexity. The processes check base stations' (BS) traffic loading and those with lesser loads concerning a target threshold number of users and the minimum user distance that are switched into sleep mode. The smart base station configured as described herein clusters the users around them according to the particular process requirements set forth below.

With respect to the following sector based clustering processes, consider a cell with twelve sectors with 30° reference angles each. The maximum power is divided into 12 sector antennas, which are adjacent to each other with output power independent or merged accordingly as needed to save total power. The antenna system is a combination of both omnidirectional and sector antennas, which are sensitive to the last user distance from the base station and user density in each industry. The base station senses the previous user distance using the omnidirectional antenna and the total transmit power is adjusted based on distance. When the users send a request to the base station, it responds with the users' corresponding distance using channel state information (CSI). Therefore, the transmit power is adjusted based on user distance that is at the furthest from the base station. Before the power adjustment operation, the base station counts the number of users in the sector. If there is no user in the subject sector, the base station sleeps until the optimum amount of users enters the sector. Thus, the radius of the cell dynamically shrinks to the position of the end user and the transmit power is adjusted accordingly.

When the users start scanning, the base station immediately counts the number of users in each sector to find the threshold value, $T_d$. Threshold value changes per scan as the number of users per sector may change for each scan due to user mobility. Therefore, $T_d$=N/A, where N is the number of concentric circles per one cell and A is the cell coverage area. As a result, an adaptive last user sensitive sector based on the user-clustering process is provided to optimize the transmit power as follows:

1. Initialize $P_t$, N, n, $T_d$, A, $A_n$, $D_n$, $P_n$, n=1, $R_n$
2. Find $R_n$
3. Find N
4. $T_d$=N/A
5. $P_n$=$P_t$/n
6. Count number of users, $N_s$ in each sector
7. $D_n$=$N_n$/$A_n$
8. Compare $D_s$ with $T_d$
9. If $D_n$<$T_d$
10. Then
11. $P_n$→0
12. Increment n
13. If n=maximum
14. Then
15. Find the total transmit power by summing up all sectors' power
16. T time delay
17. Go to step 1
18. Else
19. Go to step 6 where $P_t$ is total transmit power allocated for the cell, N is the total number of users in the cell, n is the number of active sectors to be used, A is the total area of the cell, $A_n$ is the area of each sector, $D_n$ is the specific density of n sectors, $P_n$ is transmitting power to be assigned for a sector if active, and $R_n$ is the last user radius. After counting users in each sector, if the number of users in two or more neighboring sectors is less than the threshold, the base station merges the neighboring active sectors. This method saves more power that can be dissipated due to the clustering process and circuit power.

Figure 6A:
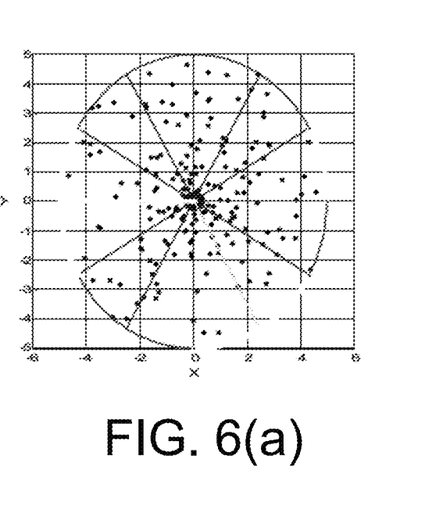
FIGS. 6(a)-6(c) show graphs of exemplary virtual sectors of mobile users forming a part of a cellular network around a base station in accordance with certain aspects of an embodiment of the invention.

The following processes (user clustering in sectors, last user sensitive clustering, and last user sensitive sector based user clustering) may then be combined to achieve the last user sensitive sector based clustering process.

a. Use Clustering in Sectors: As shown in FIG. 6(a), starting from a 30° anticlockwise direction, sectors 2, 3, 4, 5, 8, 9, and 12 are active, and each of these sectors' antennas has a distinct circuit power consumption. Each sector is equal and 30°. The clustered sectors are those that have a density above a particular threshold value. In this case, the independent clustering of sectors requires digital signal processing power in addition to circuit power. The circuit saves power because the sleeping antennas contribute more than 50% of the total saved power.

Figure 6B:
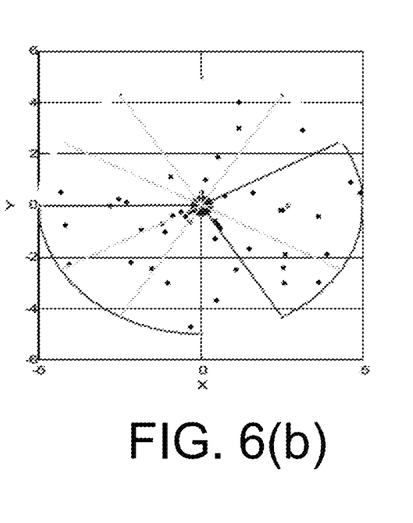
Figure 6C:
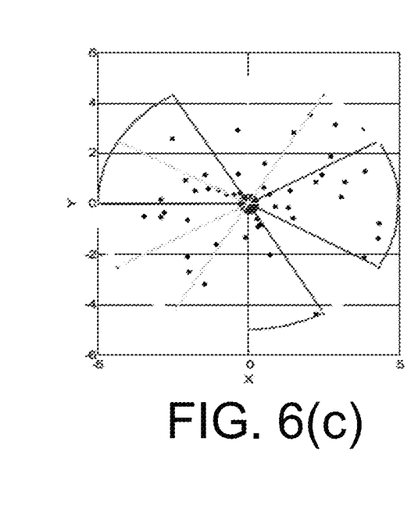
Figure 7A:
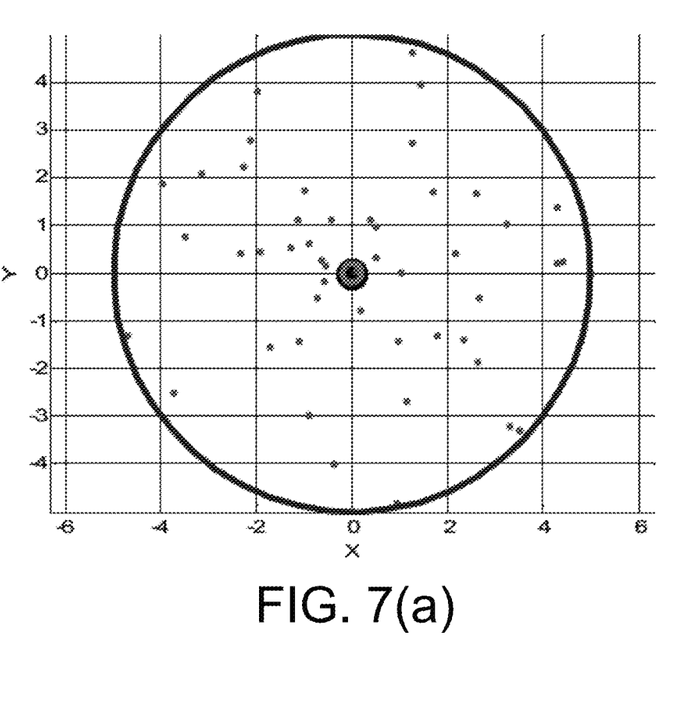
FIGS. 7(a) and 7(b) respectively show graphs of (i) maximum cell coverage, and (ii) reclustered coverage using a last user sensitive process in accordance with certain aspects of an embodiment of the invention.
Figure 7B:
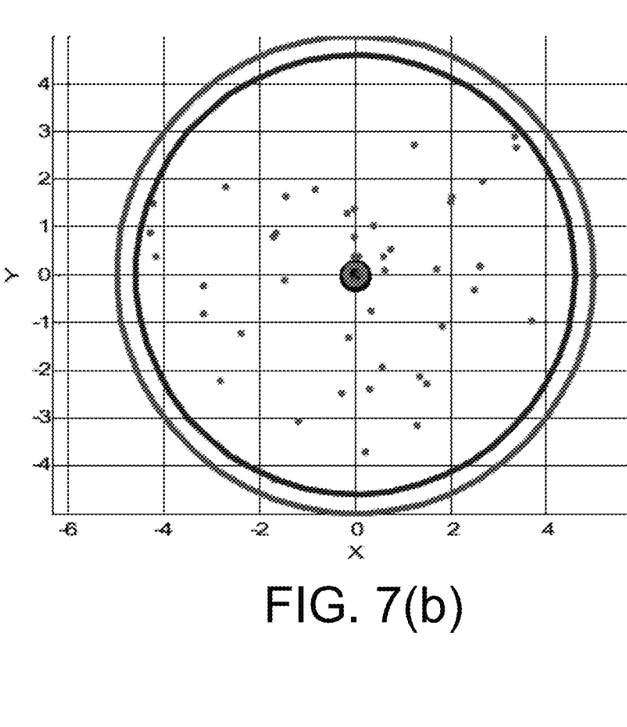
Figure 8:
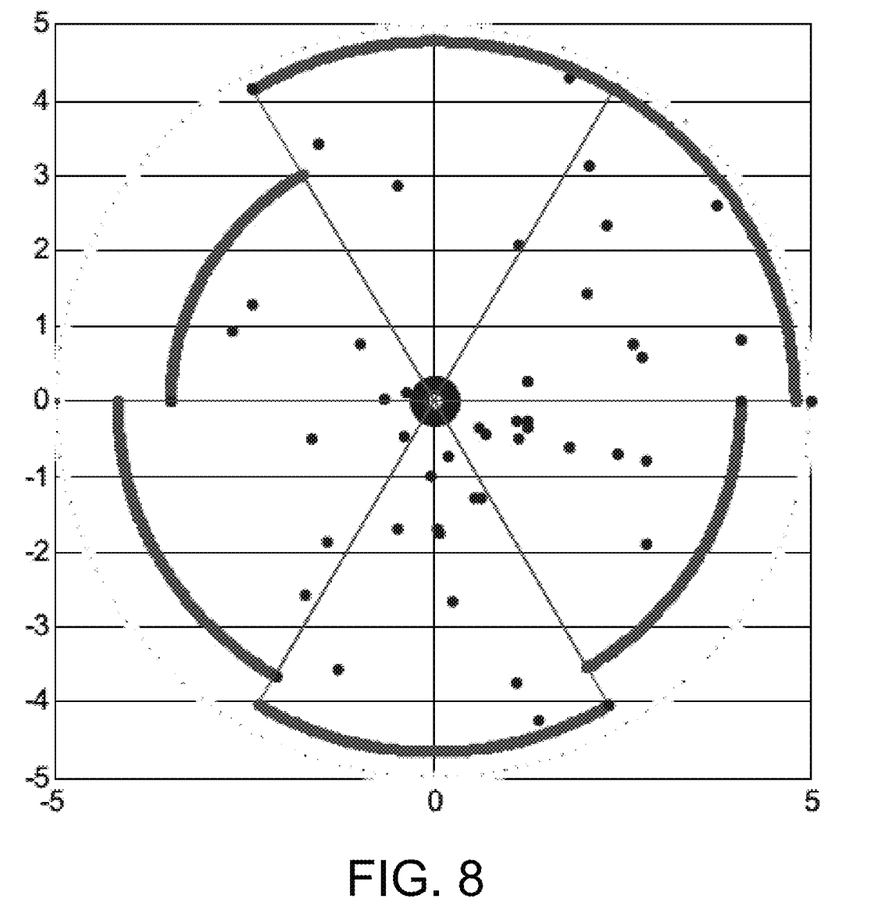
FIG. 8 is a graph of last user sensitive sector based user distribution with each antenna sensing a last user in accordance with certain aspects of an embodiment of the invention.

Neighboring active sectors are merged to save signal-processing power to partition the sectors and circuit power as the number of active sectors decreases adaptively. As shown in FIG. 6(b), because six sectors are merged to form two sectors, only the two antennas circuits are active and the other four antennas' circuit power is saved. In addition, the other six sleeping antennas' circuit power is saved. Therefore, the sum of the saved powers from each case becomes 60-80% of the total power. The same happens in the second scan, as shown in FIG. 6(c), where the number of active sectors varies from the first. Because each sector shares the total transmit power allocated to the cell, each antenna transmits 3.58 mW, which is 1/12th of the total cell's power. As seen in FIG. 6(c), the total power used is 17.9 mW due to the active sectors 1, 5, 6, 10 and 12. On the other hand, 25.1 mW of power is saved, which is 58% of the total power in one scan.

b. Last User Sensitive User Clustering: Using the omnidirectional antennas, the base station scans for active users, and when it senses the farthest user in the cell, it calculates the distance and allocates the power. FIG. 7(a) shows the random distribution of user's over the cell's maximum coverage. In FIG. 7(b), the cell is clustered into three regions depending on the number of users and minimum radius before power adjustment. The regions are the innermost region where no user is available, the main body of the cell where users reside, and the last is the outermost region where no user exists after finding the previous user. The area between the two tracks (the blue and red colored lines) is the cutout region. In this simulation, FIGS. 7(a) and 7(b) show that the average distance to the position where the last user exists occurs at 4.6 km and a transmit power of 30.1 mW for a single scan. As a result, 0.3 mW of power is saved, and no user can be marginalized in this user clustering mechanism.

c. Last User Sensitive Sector Based User Clustering: As shown in the graph of FIG. 8, the base station allows each antenna at each sector to sense the corresponding last users and adjusts its sector radii to manage transmit power allocation independently in each sector. As a result, an average of 15-20% energy can be saved by the 10$^{th}$ scan.

In summary, with respect to the three processes described above, no user is out of service and the signal processing power due to user clustering is minimal.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A method of operating an adaptive antenna array at a base station of a cellular network, comprising:

driving an array propagation vector $\bar{v}$ the base station, where $\bar{v}=e^{jn(\beta d\cos\theta)}$, wherein e is assigned energy, n is a particular antenna element, β is a phase constant, d is a spacing between antenna elements, and θ is an angle of incident at which a wave front arrives and impinges the antenna array;

initialize a weight value W where $W=[0\ 0\ 0\ \ldots\ 0]^T$;

determine an array factor AF initialized to 0 using $AF_{initial}=W\cdot\bar{v}=0$;

determine a weight value W in each of K iterations using:

$(k)=W(k-1)+\bar{g}(k)[d^*(k)-X^H(k)W(k-1)]$;

update said AF with each weight value using:

$AF=AF_{initial}+(k)\cdot\bar{v}$;

transmit a beam from said adaptive antenna array with said AF;

determine whether said beam includes a side lobe;

upon a determination that said beam has a side lobe, apply a Kaiser side lobe canceller using:

$W=\text{Kaiser}(N,\alpha)$, wherein N is a Kaiser window size and α is a Kaiser window attenuation factor; and assign said beam to a user of said cellular network.

2. The method of claim 1, wherein said cellular network further comprises multiple mobile stations, wherein a beam energy assigned to said beam is defined by:

$(BS,ms)=(\theta_{BW}/360(d(BS,ms)*SNIR)^\alpha)+C1)+C2$ where $\theta_{BW}$ is beam width, d is coverage distance (range), C1 is overhead due to a medium access control (MAC) message, C2 is overhead due to energy needed to tune a direction of the beam, BS is a base station, and ms is a mobile station.

3. The method of claim 2, wherein said beam width comprises an angular distance between half power points of a main lobe of said beam, wherein said half power points from a normalized array factor (AF) are defined by:

$HP_{AF}=0.707(AF_n)$.

4. The method of claim 1, further comprising the steps of:

establishing a plurality of virtual concentric circles around the base station;

determining a number of mobile stations within said plurality of virtual concentric circles, the radii of said concentric circles, an average density of mobile stations within each said concentric circle, a minimum radius Rmin of said plurality of concentric circles, and a track number Tn between two consecutive concentric circles;

counting a number of mobile stations between Tn and Tn-1;

calculating an area of track Tn;

determine a density of mobile stations in track Tn and compare with the average density; and adjust a transmit power of the beam in track Tn based on said determined density of mobile stations.

5. The method of claim 1, further comprising the steps of:

determining a number of mobile stations within a defined circle around the base station;

dividing an area defined by said circle into a number of sectors;

determining a number of mobile stations in each sector;

determining an independent power level at which said beam is to be transmitted for each sector based upon a density of users in each said sector; and transmitting said beam in each sector at said determined power level.

6. A system for operating an adaptive antenna array at a base station of a cellular network, comprising:

a base station having a cell zooming server; and an adaptive antenna array;

wherein said cell zooming server further comprises computer executable instructions stored thereon and configured to:

drive an array propagation vector $\bar{v}$ at the base station, where $\bar{v}=e^{jn(\beta d\cos\theta)}$, wherein e is assigned energy, n is a particular antenna element, β is a phase constant, d is a spacing between antenna elements, and θ is an angle of incident at which a wave front arrives and impinges the antenna array;

initialize a weight value W where $W=[0\ 0\ 0\ \ldots\ 0]^T$;

determine an array factor AF initialized to 0 using $AF_{initial}=W\cdot\bar{v}=0$;

determine a weight value W in each of K iterations using:

$(k)=W(k-1)+\bar{g}(k)[d^*(k)-X^H(k)W(k-1)]$;

update said AF with each weight value using:

$AF=AF_{initial}+(k)\cdot\bar{v}$;

transmit a beam from said adaptive antenna array with said AF;

determine whether said beam includes a side lobe;

upon a determination that said beam has a side lobe, apply a Kaiser side lobe canceller using:

$W=\text{Kaiser}(N,\alpha)$, wherein N is a Kaiser window size and α is a Kaiser window attenuation factor; and assign said beam to a user of said cellular network.

7. The system of claim 6, wherein said cellular network further comprises multiple mobile stations, wherein a beam energy assigned to said beam is defined by:

$(BS,ms)=(\theta_{BW}/360(d(BS,ms)*SNIR)^\alpha)+C1)+C2$ where $\theta_{BW}$ is beam width, d is coverage distance (range), C1 is overhead due to a medium access control (MAC) message, C2 is overhead due to energy needed to tune a direction of the beam, BS is a base station, and ms is a mobile station.

8. The system of claim 7, wherein said beam width comprises an angular distance between half power points of a main lobe of said beam, wherein said half power points from a normalized array factor (AF) are defined by:

$$HP_{AF}=0.707(AF_n).$$

9. The system of claim 6, wherein said computer executable instructions are further configured to:
- establish a plurality of virtual concentric circles around the base station;
- determine a number of mobile stations within said plurality of virtual concentric circles, the radii of said concentric circles, an average density of mobile stations within each said concentric circle, a minimum radius Rmin of said plurality of concentric circles, and a track number Tn between two consecutive concentric circles;
- count a number of mobile stations between Tn and Tn-1;
- calculate an area of track Tn;
- determine a density of mobile stations in track Tn and compare with the average density; and
- adjust a transmit power of the beam in track Tn based on said determined density of mobile stations.

10. The method of claim 6, wherein said computer executable instructions are further configured to:
- determine a number of mobile stations within a defined circle around the base station;
- divide an area defined by said circle into a number of sectors;
- determine a number of mobile stations in each sector;
- determine an independent power level at which said beam is to be transmitted for each sector based upon a density of users in each said sector; and
- transmit said beam in each sector at said determined power level.

* * * * *